United States Patent [19]

Scott

[11] Patent Number: 4,970,582
[45] Date of Patent: Nov. 13, 1990

[54] METHOD AND CIRCUIT FOR RECOVERING A LOGIC SIGNAL FROM A BAND LIMITED SIGNAL CHANNEL

[75] Inventor: Stephen Scott, Brossard, Canada

[73] Assignee: Skotel Corporation, Quebec, Canada

[21] Appl. No.: 370,645

[22] Filed: Jun. 23, 1989

[51] Int. Cl.$^5$ .............................................. H04N 9/64
[52] U.S. Cl. ...................................... 358/211; 360/41; 360/46; 360/14.3
[58] Field of Search ............... 358/21 V, 147; 375/22, 375/23; 360/14.3, 41, 46

[56] References Cited

U.S. PATENT DOCUMENTS 3,831,193  8/1974  McSweeney .......................... 360/42
3,987,484 10/1976  Bosche ................................ 360/14.3

Primary Examiner—Howard W. Britton
Assistant Examiner—Amir Zarabian
Attorney, Agent, or Firm—Sixbey, Friedman, Leedom & Ferguson

[57] ABSTRACT

A method and circuit for recovering from a video signal a digital Vertical Interval Time and Control Code (VITC) signal which has been distorted in the recording process. The video signal is passed through an appropriate high pass (differentiating) filter to remove all but the narrow spectrum associated with the rising and falling edges of the NRZ modulated VITC signal. Optionally, the signal may be low-pass filtered to improve noise immunity and remove any chroma or burst frequency components. The resulting output signal is a separate series of positive and negative pulses with an average DC value of zero. These pulses correspond to the rising and falling edges of the original VITC signal, are detected and used to reconstruct the original VITC signal. The positive pulses are delayed and then used to set a flip-flop while the negative pulses are used to reset the flip-flop. The output of the flip-flop will substantially correspond to the original VITC signal.

13 Claims, 4 Drawing Sheets

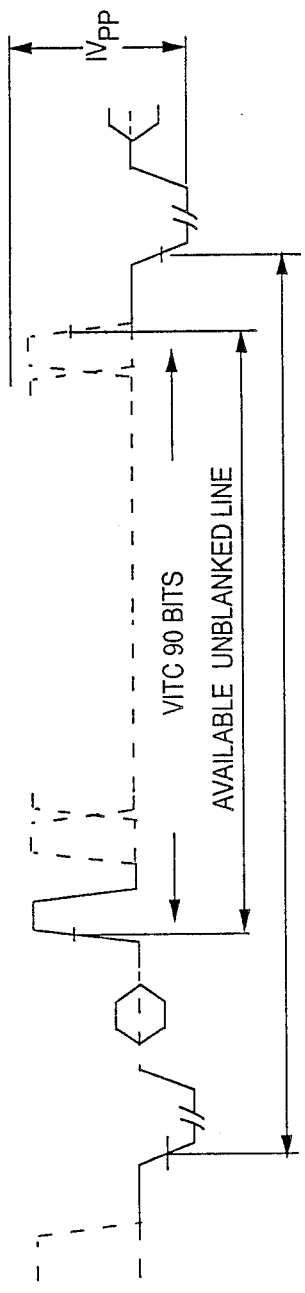
FIG. 1
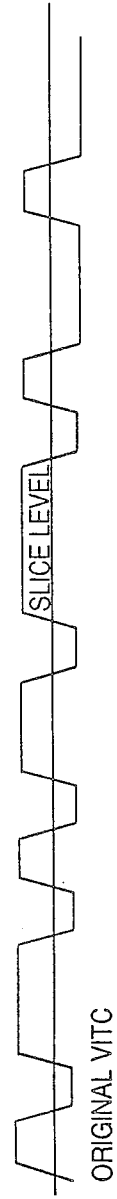
FIG. 2A
FIG. 2
ORIGINAL VITC
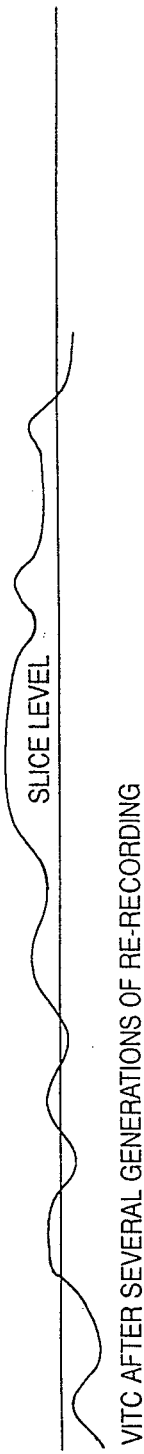
FIG. 2B
VITC AFTER SEVERAL GENERATIONS OF RE-RECORDING

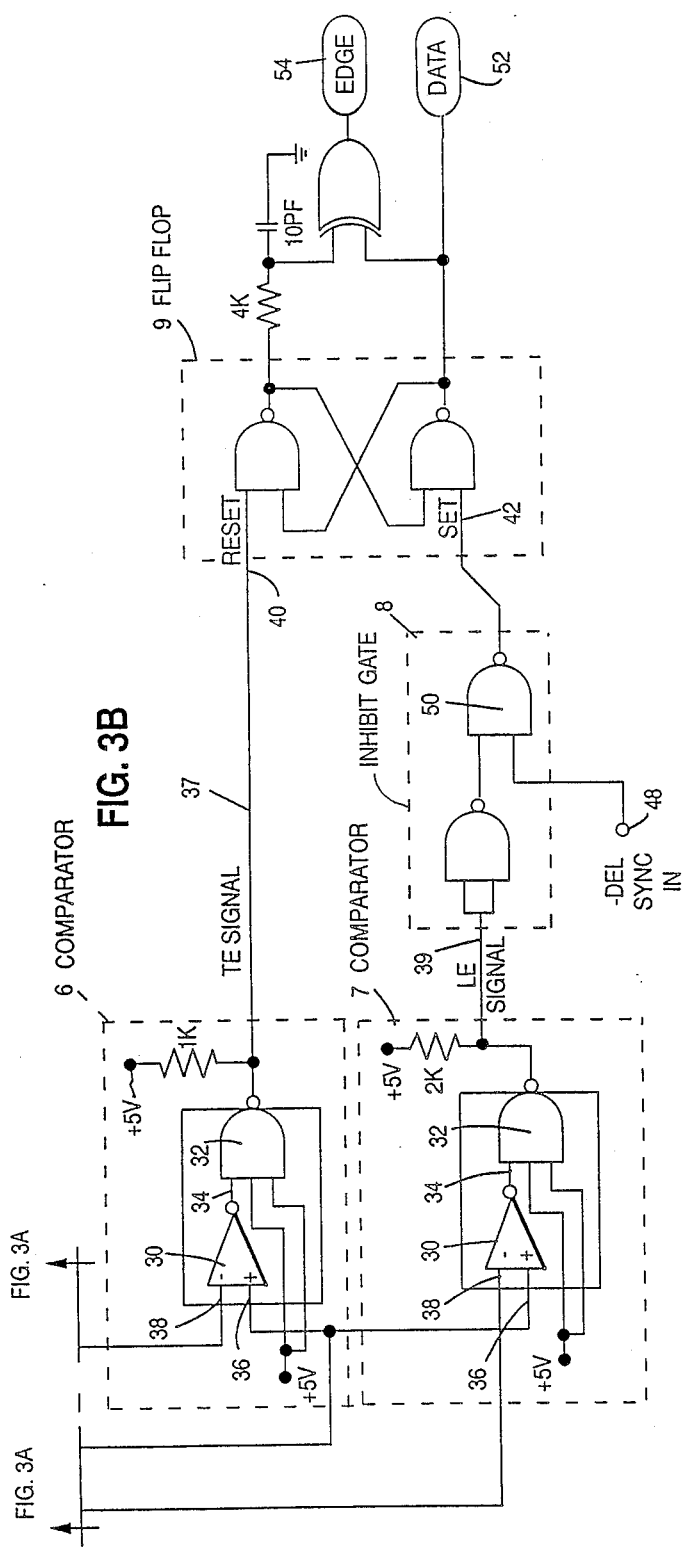

METHOD AND CIRCUIT FOR RECOVERING A LOGIC SIGNAL FROM A BAND LIMITED SIGNAL CHANNEL

BACKGROUND OF THE INVENTION

A digital Vertical Interval Time and Control Code (VITC) is an American National Standards Institute (ANSI) standard code which is inserted into two non-consecutive lines of the vertical interval of a video signal. In the video program production industry, the VITC is normally non-return to zero (NRZ) modulated and inserted in analog video signals to provide an index for video editing and multi-tape synchronization.

Traditionally, the VITC code is recovered with a threshold detector set to switch at half the amplitude of the digital VITC signal. More sophisticated approaches compensate for signal amplitude variations and distortion by varying the switching level of the threshold detector, but the level is still maintained at a constant level throughout a given video line.

Unfortunately, the video recording process utilized on many recorder formats such as U-Matic, VHS, or Beta requires filtering of the video signal into its luminance and chrominance components. This process restricts the luminance bandwidth to about 2.7 Megahertz (3 Decibel point).

When a video signal containing a VITC code is recorded and played back, it is slightly distorted as a result of the band limitation described. Although this distortion may not be significant in a first-generation recording, the buildup of distortion after as few as three re-recordings may prevent recovery of the VITC code using traditional techniques.

Many prior art systems have been developed to recover VITC or similar control codes, but these systems are generally complex and not adapted to recover NRZ data which has been directly recorded without the benefit of a modulation scheme. For example, U.S. Pat. No. 3,987,484 to R.P. Bosche et al discloses a circuit for outputting NRZ data from an input signal. This circuit includes threshold detectors which detect whether an input amplitude of an audio signal is greater than twenty-five and seventy-five perdent, respectively, of the full amplitude of the carrier. The function of the circuit is to recover NRZ data from a signal where the data is modulated/encoded as a series of tone bursts with three amplitude levels (zero, 50% and 100%). The circuit utilizes threshold detectors feeding retrigerable oneshots to filter out the modulating carrier and a flip-flop at the output is used to store the last detected logic level.

U.S. Pat. No. 4,210,785 to W.B. Huber et al discloses a tape replay system which uses digital filtering techniques to implement a frequency discriminator to recover binary data which has been encoded using two frequencies. Each binary bit of data is encoded as a burst as two frequencies such that a binary '0' is represented by a cycle of a high frequency followed by a few cycles of a lower frequency and a binary '1' is represented by a number of cycles of the high frequency followed by cycles of the lower frequency. The circuit uses edge detector and flip-flop elements, but is not a simple circuit adapted to recover a VITC data signal which has been subject to phase and/or amplitude distortion and which is not uniform over the frequency spectrum occupied by the signal.

Finally, U.S. Pat. No. 4,167,028 to R. Tobey discloses a method and apparatus for time signal encoding/decoding in a tape replay system where the purpose of the circuit is to decode data which is encoded as a pulse width modulation of the control track pulses recorded on video tape. The encoded data signal is within the bandwidth of the system which employs Schmidt trigger and flip-flop elements in a decoder.

In view of the known prior art, it is apparent that there is a need for a simple method of accurately recovering VITC code signals from analog video signals when the VITC signals are distorted.

OBJECTS OF THE INVENTION

Therefore, it is an object of this invention to provide a method and system for accurately recovering a VITC code from a band-limited video signal despite distortion of the VITC signal.

It is a further object of the invention to provide a method and system for recovering a VITC data signal, where the signal has been subjected to amplitude distortion which is not uniform over the signal's frequency spectrum.

A further object of the invention is to provide a method and system for recovering a VITC data signal, where the signal has been subjected to phase distortion which is not uniform over the signal's frequency spectrum.

Yet another object of the invention is to provide a method and system for recovering a VITC data signal in the presence of broadband noise.

A further object of the invention is to provide a method and system for recovering a VITC data signal when the overall signal amplitude is higher or lower than the prescribed standard.

Another object of the invention is to provide a method and system for reconstructing a distorted VITC signal to its prescribed signal waveform by removing the lower frequency components of the video signal which includes the VITC signal to obtain a series of positive and negative pulses associated in time with the rising and falling edges of the VITC signal and using these pulses to reconstruct the VITC signal.

It is a further object of the invention to provide a signal recovery method applicable to bi-level encoded data signals other than VITC signals.

Another object of the invention is to provide a method and system for recovering a VITC, or other bi-level logic signals with various types of distortion without need for manual or automatic gain or threshold detection level adjustments.

It is a further object of this invention to provide a circuit for achieving the preceding objectives, i.e. recovering a VITC code from a video signal despite any distortion of the VITC signal. The circuit includes a buffer section to buffer the video signal and a filter section to remove all but the narrow frequency spectrum associated with the rising and falling edges of the VITC signal. The filter section cooperates with a gain section to provide separate pulse trains which set and reset a flip-flop to reconstruct the VITC signal.

Other objects and advantages of the invention will be apparent to those skilled in the art upon review of the drawings and description herein in conjunction with the claims of this patent.

SUMMARY OF THE INVENTION

The foregoing objects are achieved by passing the VITC or other distorted bi-level logic signal through an appropriate high pass (differentiated) filter to remove all but the narrow spectrum associated with the rising and falling edges of the NRZ modulated VITC signal. Optionally, the signal may be low-pass filtered to improve noise immunity and remove any chroma or burst frequency components. The signals are amplified in a differential amplifier which provides separate series of positive and negative pulses with an average DC value of zero. These pulses correspond to the rising and falling edges of the original signal with the positive pulses corresponding in time to the rising leading edge and the negative pulses to the falling trailing edge. These pulses are detected and used to reconstruct the original signal by employing the positive pulses to set a flip-flop while the negative pulses reset the flip-flop.

BRIEF DESCRIPTION OF THE DRAWINGS

FIG. 1 a diagram illustrating the undistorted waveform of a VITC code signal as it appears in one horizontal video line;

FIGS. 2a and 2b are diagrams illustrating the waveform of a VITC code signal showing the effects of reduced high frequency amplitude response;

FIGS. 3A and 3B are schematic diagrams of a preferred circuit of the present invention for recovering a logic signal from a band limited signal channel.

DETAILED DESCRIPTION OF A PREFERRED EMBODIMENT

Figure 3A:
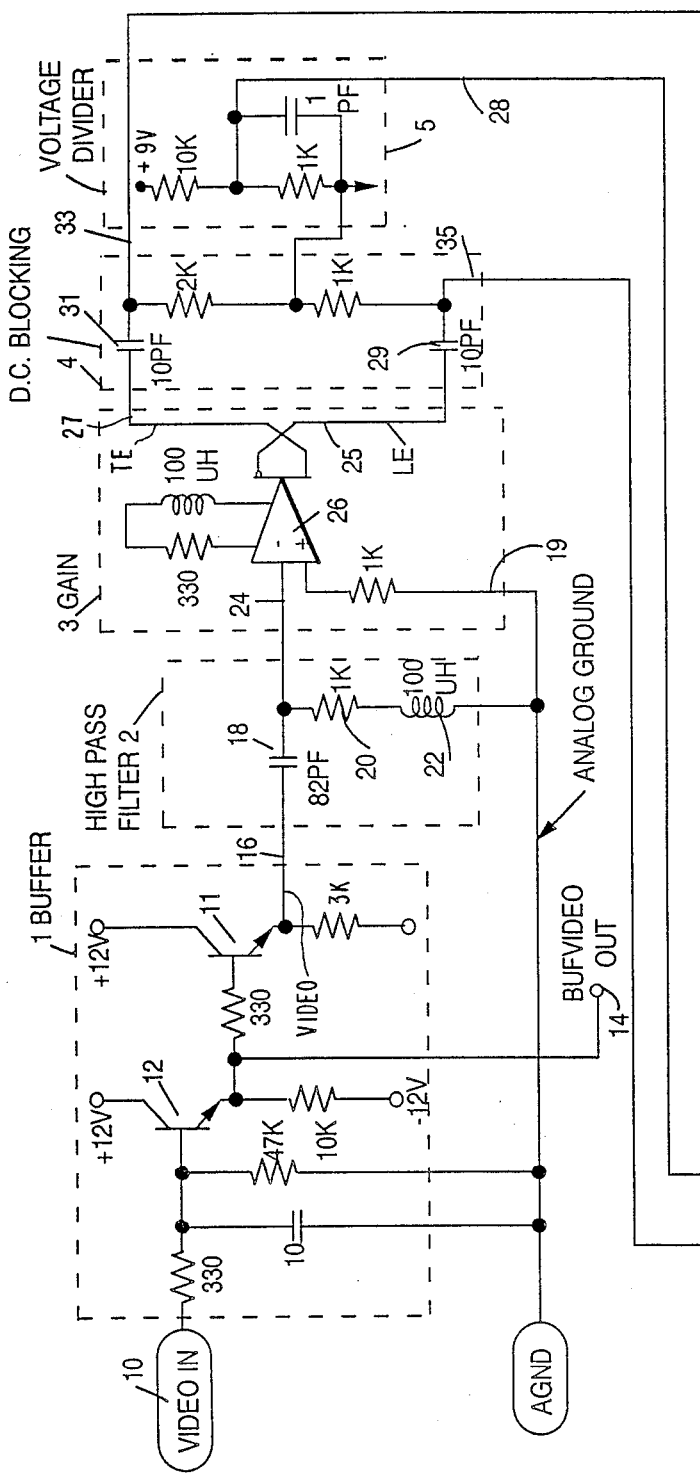

While the invention will be described in terms of a method and circuit for recovering Vertical Interval Time and Control Code (VITC) signals from recorded video signals, those skilled in the art of electrical engineering will recognize that the invention may be readily modified and applied to other situations where a distorted bi-level logic signal must be recovered.

Briefly, the VITC code consists of 64 bits of data plus overhead bits for a total of 90 bits. The code is non-return to zero (NRZ) modulated and redundantly inserted into two non-consecutive lines of the vertical interval of the video signal. The clock rate for the data is about 1.8 Megahertz which equates to a single bit pulse width of about 560 Nanoseconds. The VITC signal level is about 0.55 volts peak-to-peak (80 IEEE units) when inserted into a one volt peak-to-peak video signal (140 IEEE units). FIG. 1 shows generally the location of the VITC code word on the horizontal video line.

Further detail of the VITC code is not provided here since the code is described in substantial detail in the American National Standards Institute/Society of Motion Picture and Television Engineers standard ANSI/SMPTE 12M-1986 "Time and Control Code, for video and audio tape, for 525 line/60 field television systems." A similar standard developed by the European Broadcast Union is described in EBU Technical Document 3097-E, "EBU time-and-control codes for television tape-recordings."

FIGS. 2a and 2b illustrate the effect of reduced high frequency amplitude response of the analog video signal on the VITC. FIG. 2a shows a portion of an original VITC signal, while FIG. 2b shows the same signal portion after several generations of rerecording. The video recording process involves the filtering of the video signal into its luminance and chrominance components thereby restricting the luminance bandwidth. When a video signal containing VITC is recorded and played back, it undergoes a small distortion. This distortion is compounded by multiple generations of re-recording and becomes so significant that the recovery of the VITC signal is difficult or impossible using traditional techniques.

The slice level, or threshold detector switching point, used in prior art recovery devices is superimposed on the signals as shown in FIGS. 2a and 2b. Those skilled in the art will immediately observe in FIG. 2b that the original VITC signal cannot be recovered by threshold detection of the re-recorded signal using the fixed slice level. In fact, the amplitude of the distorted VITC signal of FIG. 2b varies within a single horizontal scan line, so that even a line-by-line adjustment of the slice level will not allow reconstruction of the original VITC signal.

By the technique of Fourier analysis, the VITC signal can be expressed as a series of spectral components. The well-defined, substantially square waveform of FIG. 2a contains a multitude of frequency components. When some of these spectral components are lost due to band-limited re-recording or transmission, the smoother, less-defined waveform of FIG. 2b results. Despite the phase, amplitude, and bandwidth distortions of the signal, it is known that the original signal was a bi-level signal with particular amplitude and timing characteristics. Given these defined signal characteristics, the data can be reconstructed in its original form using the present invention even though some of the original spectral components are missing.

To accomplish this result, the distorted signal is filtered to remove all frequencies but the narrow spectrum associated with the rising and falling edges of the NRZ modulated VITC signal. In the case of recorded VITC signals, a high-pass filter alone will perform this function because the video recorder has already restricted the upper frequency limit of the luminance signal. Of course, additional low-pass filtering may be included to improve noise immunity and remove any chroma or burst frequency components.

The filtered signal is composed of positive and negative pulses which correspond to the rising and falling edges of the original signal. These pulses are then separately detected and used to set and reset a flip-flop. When circuitry is provided to ensure the initial state of the flip-flop, the flip-flop output will be an accurate reconstruction of the original signal.

The circuit shown in FIG. 3 is a preferred embodiment capable of performing the method of the present invention. In operation, a video signal with an encoded VITC is fed to the video input 10 of a conventional buffer circuit 1. This buffer circuit includes transistors 11 and 12 and associated resistors and capacitors. The buffer circuit 1 provides the DC level and signal amplification required by the remaining sections of the system, and also provides a buffered video signal at output 14 which is fed to a synchronization separator 11 shown in FIG. 4 to generate timing signals as will be subsequently described.

An output 16 of the buffer circuit carries a buffered video signal which is filtered by a high pass filter 2. The filter 2 includes a capacitor 18, a resistor 20 and an inductance 22 connected to produce a filtered signal on an output line 24 to a first input for a gain section 3. The resistor 20 and inductance 22 are connected in series on the output side of the capacitor 18 across the first input and a second reference input 19 to the gain section.

The high pass filter and gain section differentiate and amplify the buffered video signal which is received from the output 16 and filter it to remove all but the narrow spectrum associated with the rising and falling edges of the NRZ modulated VITC signal. Thus, the amplified output signals on output lines 25 and 27 from the gain section will be a series of positive and negative pulses with an average DC value of zero. These pulses, which correspond to the rising and falling edges of the original VITC signal will ultimately be used in accordance with the present invention to reconstruct the orignal signal. Any amplitude or phase response variation over the narrower frequency spectrum provided by the high pass filter will be fairly uniform, and the spectral content of the output pulses is similar for both the leading and trailing edge pulses.

Normally, the use of the high pass filter 2 is all that is required, since the video recorder, being a low pass filter, has already restricted the upper frequency limit of the luminance signal. However, a low pass filter could be added before or after the high pass filter 2 to receive the buffered video signal and to provide additional filtering to improve noise immunity and to remove any chroma or burst frequency components.

The filtered signal on an output line 24 for the high pass filter is further amplified in the gain section 3 which includes an operational amplifier having a first input to receive the filtered signal and a reference input connected to reference input 19 which is a ground level input. The operational amplifier provides positive pulses LE on output line 25 which represent the rising or leading edges of the VITC signal and negative pulse TE on the output line 27 which represent the falling or trailing edges of the VITC signal. The LE and TE pulses are fed respectively to two capacitors 29 and 31 of a DC blocking section 4. This DC blocking section removes from the input pulse signals any DC offset introduced by the gain section 3. From the DC blocking section, the TE and LE signals are fed to level comparators 6 and 7, respectively, by means of output lines 33 and 35.

A resistor voltage divider circuit 5 is connected to provide a DC reference signal on a reference output line 28. This reference signal is used as a reference input signal for the comparators 6 and 7.

Each of the comparators 6 and 7 is a signal level comparator having a comparator amplifier 30 and an output gate 32. The output gate has two control inputs and a signal input 34 connected to the output of the comparator amplifier. Each comparator amplifier has a reference input 36 connected to output line 28 and a signal input 38. The signal input 38 of the comparator 6 is connected to output line 33 while the signal input 38 of the comparator 7 is connected to the output line 35.

The level comparators 6 and 7 provide level detected TE and LE pulse signals on outputs 37 and 39 respectively to the inputs of an SR flip-flop 9. The LE signals set flip-flop 9, and the TE signals reset flip-flop 9. It will be noted that the TE signals are fed directly to a reset input 40 for the flip-flop 9, while the LE signals pass through a pulse inhibit gate 8 before reaching a set input 42 for the flip-flop This is necessary, as the pulse created by the trailing edge of the video synchronization signal may cause a false LE detection, setting the flip-flop 9 at the wrong time. This erroneous setting of flip-flop 9 is prevented by temporarily inhibiting the LE signal as will be described.

Figure 4:
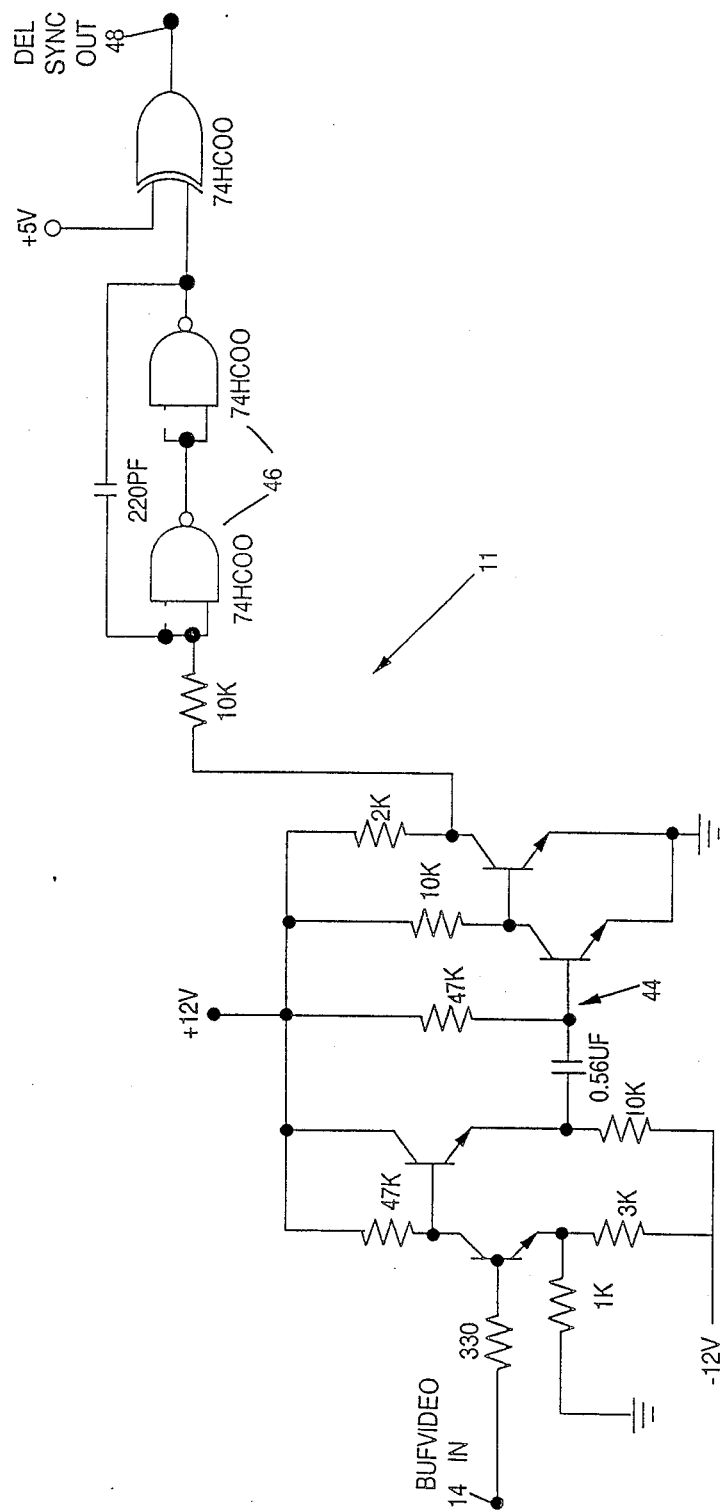
FIG. 4 is a schematic diagram of a synchronization separator circuit which provides timing signals to the circuit of FIG. 3.

The LE signal output of comparator 7 passes through pulse inhibit gate 8 after leaving comparator 7 and before passing to flip-flop 9. As previously mentioned, the buffered video output signal on line 14 is fed to a synchronization separator circuit 11 as shown in FIG. 4. The buffered video is amplified to form a sync signal in a transistor amplifier section 44. By then passing this sync signal through a series of delay logic gates 46, this circuit produces a delayed sync signal at output 48 which is available slightly after the video sync signal. This delayed sync signal at 48 enables a gate 50 in the pulse inhibit gate 8 to allow passage of the LE signal to set flip-flop 9. For clarity, only the portions of the synchronization separator circuit 11 required to produce delayed sync signal at 48 are shown. There will be preferably included in the sync separator circuit additional circuitry to produce other useful synchronization signal outputs such as chroma, horizontal, and vertical sync signals as is well-known in the art.

Referring again to FIG. 3, the reconstructed VITC data signal is now provided at flip-flop output 52, while a second output 54 provides an edge signal.

As will be apparent to those skilled in the art, the form and arrangement of circuit elements to perform the necessary functions could be easily changed within the scope of the invention. For example, the filter could be replaced with a simpler or more complex filter as needed for a particular application. The simple threshold detectors provided by the comparators 6 and 7 which are used to detect the leading and trailing edge pulses could be replaced with a more sophisticated variable threshold detector or a peak detector. The flip-flop used to reconstruct the bi-level VITC signal could be replaced with an alternate circuit to reconstruct a multi-level logic signal.

INDUSTRIAL APPLICABILITY

As made clear by the embodiment disclosed, the invention is particularly applicable within the art of video editing, mixing, and recording. However, the invention may be applied broadly within the field of electrical engineering wherever it is necessary to recover a distorted bi-level logic signal.

I claim:
1. A method of recovering a bi-level logic signal which has been distorted which includes the steps of:
   a. filtering the signal to substantially remove frequency components not associated with the rising and falling edges of the bi-level logic signal to obtain two separate pulses corresponding respectively to the rising and falling edges of the logic signal;
   b. detecting the series of pulses; and
   c. reconstructing the bi-level logic signal from the pulses.

2. The method of claim 1 wherein the bi-level logic signal is a vertical interval time and control code combined with a video signal.

3. A method of recovering a bi-level logic signal comprising the steps of:
   a. filtering the signal to substantially remove frequency components not associated with the rising and falling edges of the bi-level logic signal, leaving a series of positive and negative pulses corresponding to the rising and falling edges of the logic signal;

b. comparing the series of pulses to a continuously varying average signal level derived from the series of pulses to produce signals representative of leading and trailing edges of the original undistorted bi-level logic signal;

c. detecting the leading and trailing edge signals and reconstructing the bi-level logic signal from the leading and trailing edge signals.

4. The method of claim 3 wherein the bi-level logic signal is a vertical interval time and control code included in a video signal.

5. A circuit for recovering a bi-level logic signal comprising:

a. input means for receiving an input bi-level logic signal;

b. buffer means connected to said input means for buffering the input signal to produce a buffered signal;

c. filter means connected to receive said buffered signal, said filter means operating to filter the buffered signal to produce filtered output signals having components corresponding to the rising and falling edges of the bi-level logic signal;

d. level detecting means connected to receive said filtered output signals and responsive to the filtered signal components corresponding to the rising and falling edges of the bi-level logic signal; said detecting means producing level detected signals corresponding to the rising and falling edges of the bi-level logic signal; and e. reconstructing means for producing a signal which is a substantial reproduction of the original bi-level logic signal from the level detected signals produced by the detecting means, said reconstructing means being connected to receive said level detected signals.

6. The circuit of claim 5 including means for amplifying the filtered output signals connected to said filter means, and means for blocking direct current components of the amplified filtered output signals connected to said amplifying means.

7. The circuit of claim 5 wherein said filter means provides filtered output signals consisting substantially of positive and negative pulses, and the detecting means comprises two comparators, one of which is responsive to positive pulses and the remaining one being responsive to negative pulses.

8. The circuit of claim 7 which includes reference signal generating means connected to receive said filtered output signals, said reference signal generating means providing a varying signal representing the average level of the filtered output signals as a reference input to each of the said comparators.

9. The circuit of claim 7 wherein the reconstruction means is an SR flip-flop having set and reset inputs, each connected to receive an output signal from one of the comparators.

10. The circuit of claim 9 wherein the input bi-level logic signal is a vertical time and control code included in a video signal, said vertical time and control code having signals components with leading and trailing edges.

11. The circuit of claim 10 wherein the level detected signals include positive pulses corresponding to the leading edges and negative pulses corresponding to the trailing edges of the vertical time and control code signal components.

12. The circuit of claim 11 wherein the positive pulses of the level 11 detected signals are provided to the set input of the SR flip-flop and the negative pulses of the level detected signals are provided to the reset input.

13. The circuit of claim 12 wherein synchronization means are connected between said level detecting means and said SR flip-flop to delay the positive pulses of the level detected signals.

* * * * *